United States Patent
Kolkebeck et al.

(10) Patent No.: US 6,450,043 B1
(45) Date of Patent: Sep. 17, 2002

(54) PROBE FOR MONITORING INTAKE AIR VOLUME AND METHOD

(75) Inventors: Kenneth W. Kolkebeck, Harrington Park, NJ (US); Lee D. Scott, New Fairfield, CT (US)

(73) Assignee: Tek-Air Systems Inc., Danbury, CT (US)

( * ) Notice: Subject to any disclaimer, the term of this patent is extended or adjusted under 35 U.S.C. 154(b) by 0 days.

(21) Appl. No.: 09/349,262

(22) Filed: Jul. 7, 1999

(51) Int. Cl.[7] .................................................. G01F 1/46
(52) U.S. Cl. .................................................... 73/861.66
(58) Field of Search ........................ 73/861.66, 861.65, 73/147, 861.42, 716, 756, 861.22, 861.55, 170.12

(56) References Cited

U.S. PATENT DOCUMENTS

| | | | |
|---|---|---|---|
| 2,828,076 A | 3/1958 | Donahue | 236/13 |
| 3,685,355 A | 8/1972 | DeBaun | 73/861.66 |
| 4,375,769 A | 3/1983 | Brandt, Jr. | 73/861.66 |
| 4,453,419 A | 6/1984 | Engelke | 73/861.66 |
| 4,559,835 A * | 12/1985 | DeBaun | 73/861.66 |
| 4,592,239 A | 6/1986 | Cutler | 73/861.66 |
| 4,735,100 A | 4/1988 | Hajto | 73/861.66 |
| 4,768,386 A * | 9/1988 | Taddeo | 73/861.66 |
| 5,063,962 A | 11/1991 | Fahrni et al. | 73/861.66 |
| 5,233,865 A * | 8/1993 | Rossow | 73/147 |
| 5,481,925 A * | 1/1996 | Woodbury | 73/861.66 |
| 5,753,825 A * | 5/1998 | Brandt, Jr. | 73/861.66 |

* cited by examiner

Primary Examiner—Benjamin R. Fuller
Assistant Examiner—Octavia Davis
(74) Attorney, Agent, or Firm—Arthur Jacob

(57) ABSTRACT

A probe for use in monitoring intake air volume in an air handling system operates in a turbulent stream found at locations near an intake for outside air. The probe has a very large transverse peripheral profile and includes a front face having a very large impact area so as to substantially disturb the turbulent stream and effect a substantial change the direction of flow of the turbulent stream, enabling accurate measurement of differential pressures to determine intake air volume with greater precision.

18 Claims, 6 Drawing Sheets

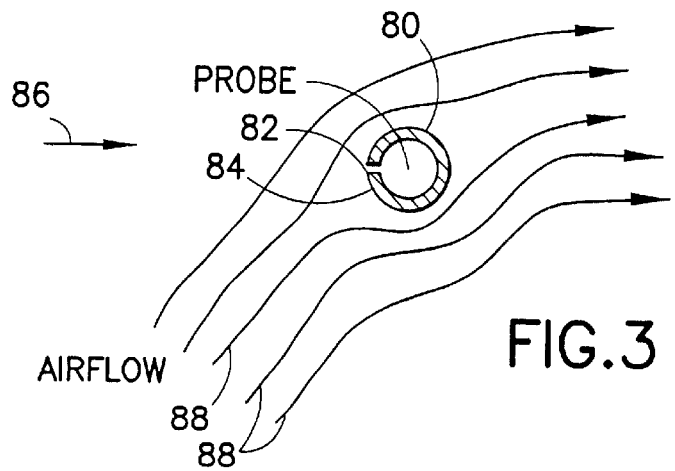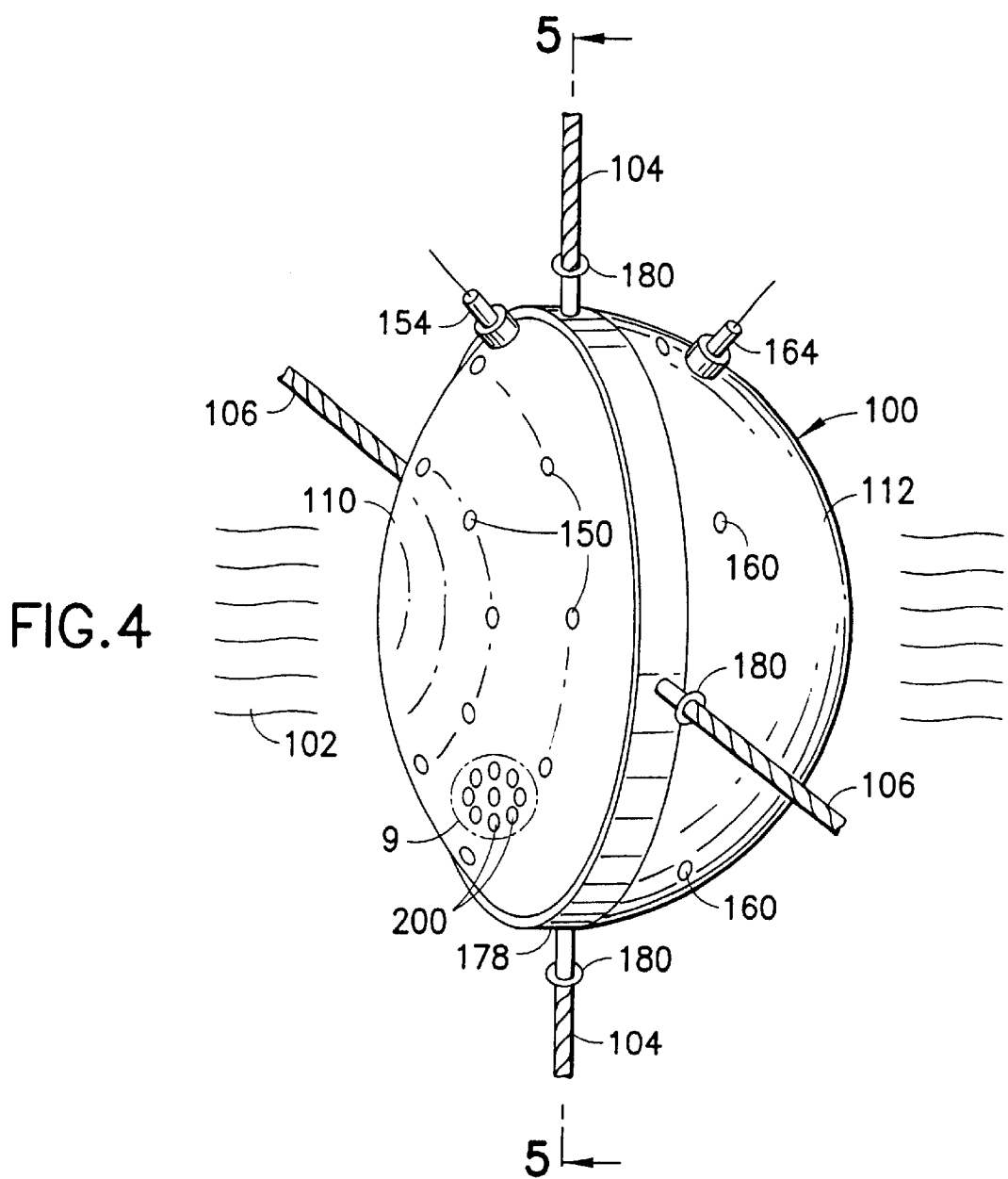

PROBE FOR MONITORING INTAKE AIR VOLUME AND METHOD

The present invention relates generally to the monitoring and control of the flow of intake air to air handling equipment, such as ventilating and air conditioning equipment, and pertains, more specifically, to a probe and a method for use in monitoring intake air volume in such air handling systems.

The measurement and control of the volume of fresh air drawn into the intake of air conditioning and ventilating equipment in a building is of utmost importance in maintaining indoor air quality for promoting the health, safety and comfort of occupants of the building. These measurements usually are carried out in connection with the use of probes placed between an outdoor air intake and the air conditioning and ventilating equipment for the purpose of determining the volume of intake air drawn into the system. Conventional airflow measurement probes are designed to operate in relatively undisturbed, essentially homogeneous airflow usually found in distribution ductwork and generally require long straight runs of ductwork in order to avoid turbulent airflow and establish the desired homogeneous flow profiles necessary for accurate volume measurement. However, typical intakes to air conditioning and ventilating equipment do not provide adequate space for the long straight runs of ductwork required to avoid turbulent airflow. This is true especially in retrofit installations where existing space often is severely limited. In addition, the volume of fresh air drawn into air handling systems will vary over a very wide range; the ratio of maximum volume to minimum volume often rising to as much as eight to one. Such a range in volume requires a probe which can operate accurately over a wide range of airflow volume. Further, intake air velocities purposely are maintained low in order to avoid drawing in rain, snow and debris, such as leaves and paper. Maximum velocities at intakes typically are one-quarter of the velocities found in distribution ductwork, thus rendering the accurate measurement of airflow at an intake much more difficult. Still further, environmental extremes, either at a single site or among a variety of sites where air handling systems are operated, present a challenge to the ability of probes to perform under all conditions, such as extremes in temperature and humidity.

Air brought into air conditioning and ventilating systems rarely is clean and can be expected to be laden with dirt and some debris. Maintenance in the vicinity of the intake to such systems hardly ever is of a preventive nature. Hence, equipment put into service under such conditions must be capable of operating for extended periods without regular maintenance.

The measurement of air volume at the intake of an air handler is complicated further by the presence of high background noise, usually in the form of short bursts and discontinuities in airflow caused by wind and wind gusts blowing against the air intake. At times, the magnitude of such a noise component can be as large as the airflow itself.

Air conditioning and ventilating equipment intake location and configuration can vary considerably, presenting challenges to the design of a probe which can accomodate a wide variety of such locations and configurations.

The present invention provides a probe and a method for use in monitoring intake air volume in air handling systems and which accomplishes such monitoring while avoiding the problems and accommodating the difficulties outlined above. As such, the present invention attains several objects and advantages, some of which are summarized as follows: Provides a probe and a method for monitoring intake air volume in an air handling system, the probe having a construction enabling effective operation when installed where the intake air is traveling in a turbulent stream; enables accurate measurement of airflow volume over a very wide range of airflow volume, and does so in the presence of turbulence in the airflow; allows accurate monitoring of airflow volume at relatively low air velocities; accommodates extremes in air temperature and humidity for accomplishing accurate airflow volume measurements at a wide variety of installation sites, as well as wide variations in conditions encountered at a single site; resists degradation of performance in the presence of dirt and debris for long-term operation with little or no periodic maintenance; is less sensitive to noise, enabling accurate measurements under a variety of wind conditions encountered at an intake to an air handling system; exhibits a very wide range of operation, enabling greater versatility in applying the probe and the method to various locations and configurations at installations encountered in the field; provides a probe of relatively simple and inexpensive construction, capable of installation with ease at conventional sites for exemplary performance of the method over an extended service life.

The above objects and advantages, as well as further objects and advantages, are attained by the present invention which may be described briefly as a probe for use in monitoring intake air volume in an air handling system, wherein intake air travels in a turbulent stream flowing in a direction downstream from an upstream air intake, the probe comprising: a high pressure chamber having a front wall including an external front face for facing upstream in the turbulent stream, transverse to the direction of flow of the turbulent stream, the front face having transverse dimensions establishing an impact area on the front face great enough to substantially disturb the turbulent stream such that upon placement of the front face in the turbulent stream the stream impacts upon the impact area of the front face for effecting a substantial change in direction of the turbulent stream; first pressure sensing holes in the front wall for establishing a first pressure in the high pressure chamber when, the probe is placed in the turbulent stream; a low pressure chamber having a rear wall including an external rear face for facing downstream in the turbulent stream, transverse to the direction of flow of the turbulent stream, when the front face faces upstream; second pressure sensing holes in the rear wall for establishing a second pressure in the low pressure chamber when the probe is placed in the turbulent stream; a seal between the high pressure chamber and the low pressure chamber for enabling the establishment of a higher first pressure in the high pressure chamber as compared to a lower second pressure in the low pressure chamber; a high pressure output for transmitting information pertaining to the first pressure in the high pressure chamber; and a low pressure output for transmitting information pertaining to the second pressure in the low pressure chamber; whereby the difference between the first pressure and the second pressure provides information pertaining to intake air volume.

In addition, the invention includes a method for use in monitoring intake air volume in an air handling system, wherein intake air travels in a turbulent stream flowing in a direction downstream from an upstream air intake, the method comprising the steps of: placing a probe in the turbulent stream, the probe having a high pressure chamber with a front wall including an external front face for facing upstream in the turbulent stream, transverse to the direction of flow of the turbulent stream, the front face having transverse dimensions establishing an impact area on the front face; substantially disturbing the turbulent stream by placement of the front face in the turbulent stream so that the stream impacts upon the impact area of the front face to effect a substantial change in direction of the turbulent stream; establishing a first pressure in the high pressure chamber indicative of a pressure at the front face when the probe is placed in the turbulent stream; the probe including a low pressure chamber having a rear wall with an external rear face for facing downstream in the turbulent stream, transverse to the direction of flow of the turbulent stream, when the front face faces upstream; establishing a second pressure in the low pressure chamber indicative of a pressure at the rear face when the probe is placed in the turbulent stream; establishing a higher first pressure in the high pressure chamber as compared to a lower second pressure in the low pressure chamber; transmitting information pertaining to the first pressure in the high pressure chamber; transmitting information pertaining to the second pressure in the low pressure chamber; and utilizing a difference between the first pressure and the second pressure to provide information pertaining to intake air volume.

The invention will be understood more fully, while still further objects and advantages will become apparent, in the following detailed description of a preferred embodiment of the invention illustrated in the accompanying drawing, in which:

FIG. 3 is a diagrammatic view showing airflow impacting a conventional total pressure probe at an angle;

FIG. 4 is a pictorial view illustrating a probe constructed in accordance with the present invention;

Figure 1:
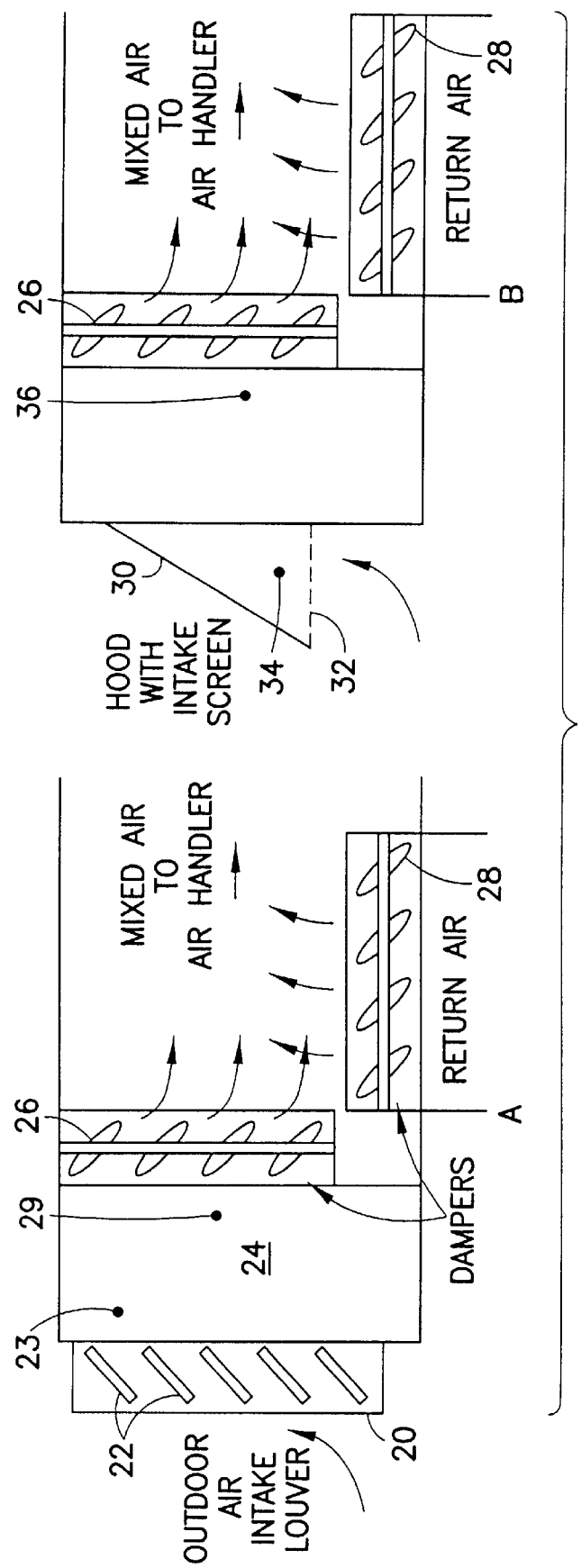
FIG. 1 is a diagrammatic view showing conventional air handler outside air intake configurations.

Referring now to the drawing, and especially to FIG. 1 thereof, air conditioning equipment outside air intake configurations vary considerably from installation to installation, and two typical distinct types are illustrated at A and B. In type A, an intake louver 20 includes multiple blades 22, usually fixed, which are designed to separate rain, snow, and debris from the air stream entering the intake. The blades 22 induce turbulence into the air traveling in the stream entering the intake, which makes measurement of the volume of intake air by conventional means located at a measurement point 23 in a measurement zone 24 adjacent the louver 20 difficult. However, the measurement point 23, located at the downstream side of the louver 20, is the most practical location for measuring intake volume from the standpoint of ease of access and space availability. Dampers 26 and 28 control the amount of fresh air and return air, respectively, which make up the mixed air passed to the air handler located downstream. In installations where air conditioning equipment draws air from an intake plenum which can serve multiple air handlers, it may be desirable to locate a measurement point 29 just before the fresh air intake damper 26. The type B intake configuration utilizes a hood 30 and a screen 32, rather than an intake louver, and measurement points are available at 34, just downstream of the screen 32, and at 36, just upstream of the fresh air intake damper 26.

Figure 2:
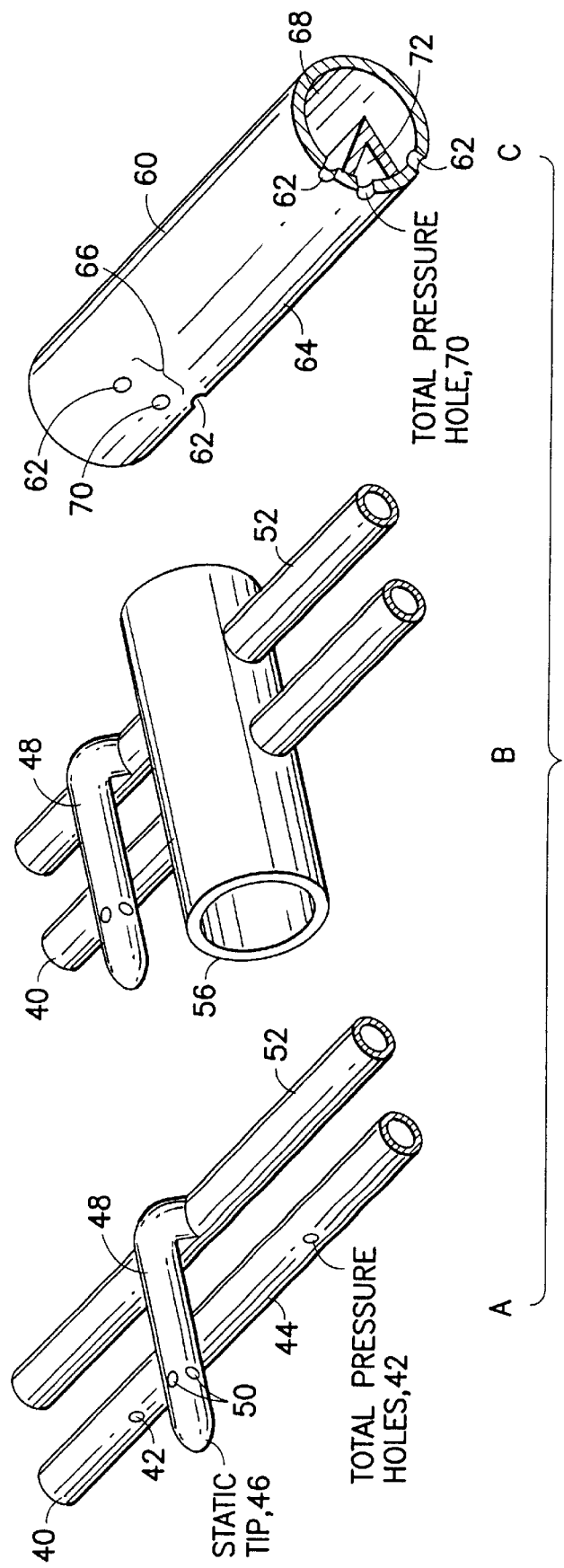
FIG. 2 is a pictorial view illustrating conventional airflow measuring probes.

Conventional probes used for the measurement of airflow volume are small impact area differential pressure probe arrangements which include small diameter tubes with pressure sensing holes. Typical dimensions for such small impact area probes include a cross-sectional diameter of about 0.25 to 1.25 inches. Three such conventional arrangements are illustrated in FIG. 2, at A, B, and C.

In arrangement A, a first small diameter tube 40 is aligned perpendicular to the direction of airflow and includes pressure sensing holes 42 at the leading edge 44 of the tube 40. Moving air impacts upon the leading edge 44 of the tube 40 and pressure builds along the leading edge 44. This pressure, called the total pressure, accumulates inside the tube 40 and is transmitted to a control system (not shown). The total pressure then is compared against a second pressure to obtain the information necessary to determine airflow volume. In arrangement A, the second pressure is static pressure, measured by a static pressure sensor in the form of a tube 46 oriented parallel with the direction of the airflow and having a static tip 48. Pressure sensing holes 50 in the tube 48 sense the static, or ambient, pressure which is transmitted to the control system via a manifold 52. In arrangement B, the pressure sensing holes of tube 40 are shrouded with a larger tube 56, known as a Keil shroud.

In the alternate arrangement C, a tube 60 is placed perpendicular to the direction of airflow and multiple pressure sensing holes 62 are provided adjacent the leading edge 64 of the tube 60 in pairs 66. Each hole 62 of a pair 66 is located at an angle of plus or minus 39.5 degrees from the centerline of the tube 60 and communicates with a first passage 68 within the tube 60. In accordance with the principle determined by Fechheimer, the pressure at holes 62 is equivalent to the static pressure. That pressure information is transmitted to a control system through first passage 68. Total pressure sensing holes 70 are located at the centerline of the tube 60 and communicate with a second passage 72 for transmission of total pressure information to the control system.

Other arrangements are available utilizing at least one tube oriented perpendicular to the direction of airflow in a duct. For example, a tube having holes placed on the downstream side of the tube, 180 degrees from the leading edge (not illustrated), or in pairs at an angle to the centerline of the tube, will establish a suction pressure within the tube. The differential between the total pressure and the suction pressure will be greater than that developed between the total pressure and the static pressure, enabling increased sensitivity for ease of measurement.

A common characteristic of all of the prior art arrangements outlined above is that because the sensing tubes have a relatively small cross-sectional area relative to the dimensions of the ducts in which the tubes are placed, the tubes do not substantially disturb the flow profile of the airstream in the duct. Hence, where the air is traveling in a turbulent stream, air flows at a high incidence angle to the tube, and the point of impact of the angled air on the tube is not where the design of the probe requires impact, causing an error. As depicted in FIG. 3, a small impact area tubular probe 80 includes a total pressure sensing hole 82 at the leading edge 84 of the probe 80, and the probe 80 is oriented for measuring airflow volume in a stream of air moving in a direction 86. However, when the probe 80 is located in a turbulent stream, turbulent air follows the directions shown at 88 and impacts the probe 80 at an angle which causes error in the measurement of total pressure. Another source of error in turbulent locations is the presence of swirling eddies formed by the disturbance created by the intake louvers. The dimensions of such swirling eddies are several orders of magnitude larger in size than the cross-sectional diameter of the tubular probe 80. As a result, the movement and shape of a swirling eddy is not altered by the probe 80 and the localized velocity at the eddy is at a high incident angle, causing error.

The present invention addresses the problems outlined above and provides a probe and a method which enables accurate measurement of airflow volume where air is traveling in a turbulent stream, as at the intake of such air handling systems as air conditioning and ventilating equipment in buildings. Turning now to FIG. 4, a probe 100 constructed in accordance with the present invention is suspended within an airstream 102, by means of suspension members in the form of vertical suspension cables 104 and horizontal suspension cables 106, so as to be located at a measurement point, such as one of the measurement points 23, 29, 34 and 36 described above. Probe 100 is oriented transverse to the airstream 102 such that a front face 110 of the probe faces upstream, essentially perpendicular to the general direction of the airstream 102, while a rear face 112 faces downstream within the airstream 102, transverse to the general direction of the airstream 102.

Figure 5:
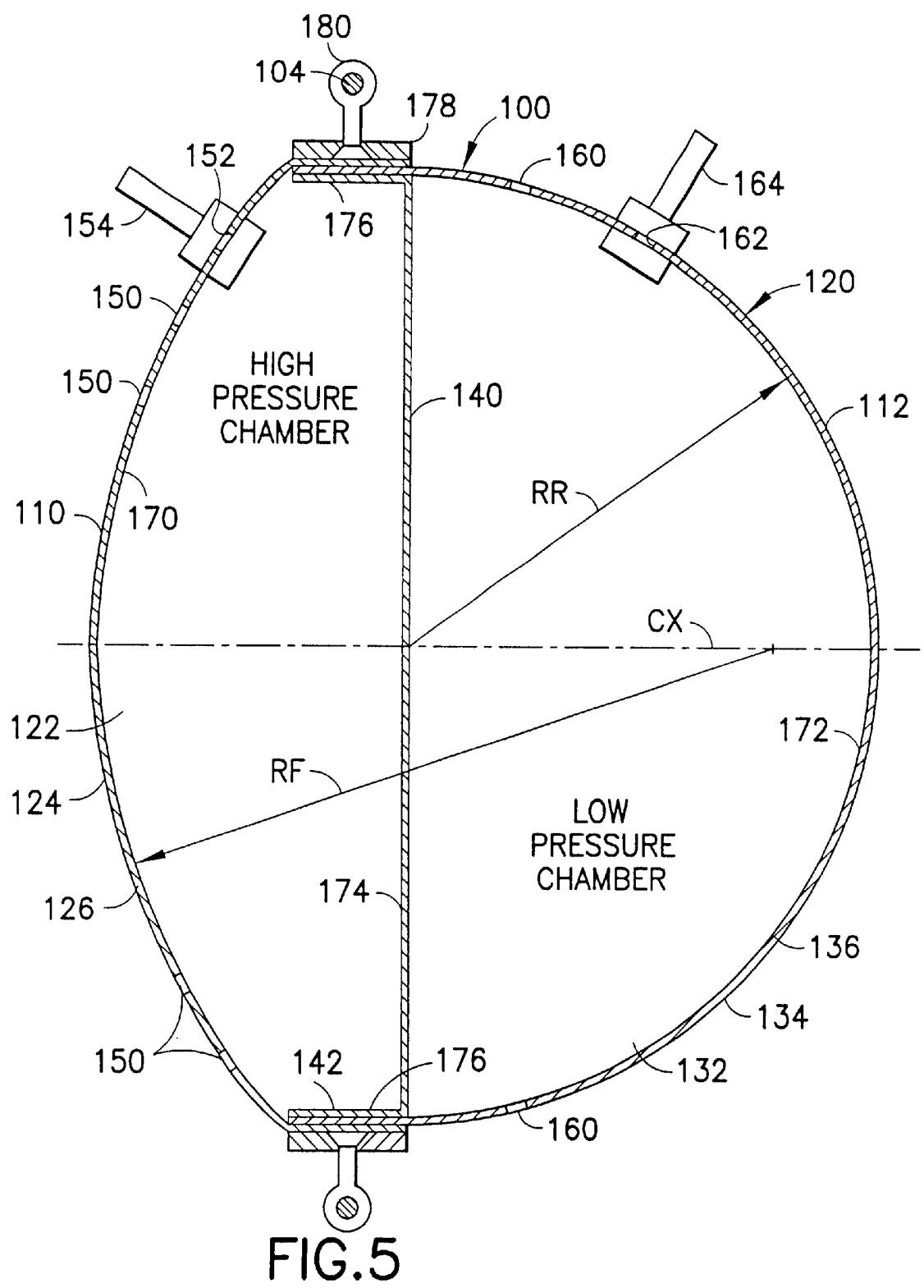
FIG. 5 is a cross-sectional view taken along line 5—5 of FIG. 4.

Referring now to FIG. 5, as well as to FIG. 4, probe 100 has a housing 120 which includes a first, or high pressure chamber 122 having a front wall 124, the outside surface 126 of which front wall 124 includes the front face 110. A second, or low pressure chamber 132 has a rear wall 134, the outside surface 136 of which rear wall 134 includes the rear face 112. A central wall 140 establishes a seal between the high pressure chamber 122 and the low pressure chamber 132. A generally cylindrical intermediate wall 142 extends longitudinally between the front wall 124 and the rear wall 134 and provides a generally cylindrical segment which serves as a smooth transition between the front face 110 and the rear face 112.

First pressure sensing holes 150 are placed in the front wall 124 for establishing a first pressure in the high pressure chamber 122 when the probe 100 is placed in the airstream 102. A high pressure pick-up port 152 in the front wall 124 includes a first fitting 154 which serves as a high pressure output for transmitting information pertaining to the pressure in the high pressure chamber 122. Second pressure sensing holes 160 are placed in the rear wall 134 for establishing a second pressure in the low pressure chamber 132 when the probe 100 is placed in the airstream 102. A low pressure pick-up port 162 in the rear wall 134 includes a second fitting 164 which serves as a low pressure output for transmitting information pertaining to pressure in the low pressure chamber 132.

The front face 110 has a convex curved configuration, the preferred configuration following a spherical contour having a first radius RF centered upon central longitudinal axis CX of probe 100. The rear face 112 also has a convex curved configuration, the preferred configuration following a spherical contour having a second radius RR centered upon axis CX. In the preferred construction, the first radius RF is greater than the second radius RR, for purposes to be described below.

Figure 6:
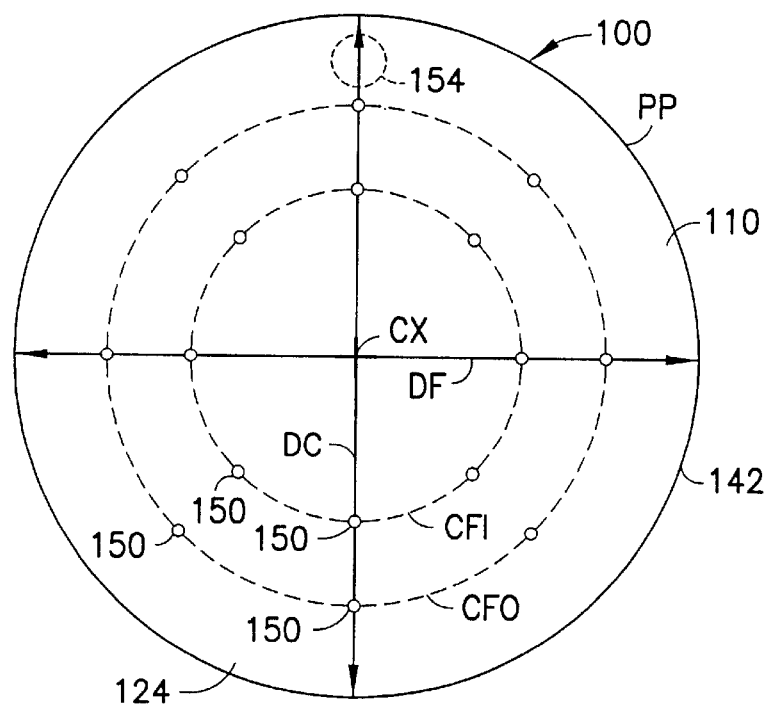
FIG. 6 is a front elevational view of the probe of FIGS. 4 and 5.
Figure 7:
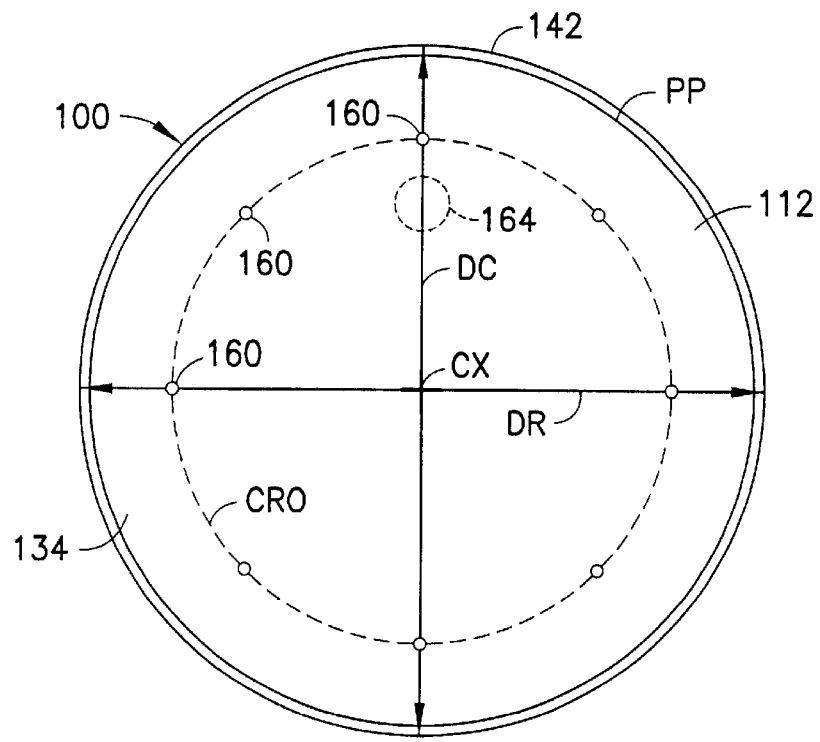
FIG. 7 is a rear elevational view of the probe.

As best seen in FIGS. 6 and 7, wherein the fittings 154 and 164 have been omitted for clarity, the transverse peripheral profile PP of probe loo preferably is circular and the front face 110 has a front transverse diameter DF which extends through central axis CX to the transverse peripheral profile PP. Diameter DF provides front face 110 with a relatively large impact area as compared to the relatively small impact area exhibited by conventional tubular probes, as described above. For example, in a typical installation where intake air velocity is within the range of about 100 fpm to 700 fpm, diameter DF is about eight inches, as compared to a diameter of about 0.25 to 1.25 inches found in commonly used small impact area tubular probes described above. A rear transverse diameter DR extends through central axis CX to the transverse peripheral profile PP. The generally cylindrical intermediate wall 142 lies along the transverse peripheral profile PP and has a diameter DC. With diameters DF, DR and DC each about eight inches, the radius RF is about six inches, while the radius RR is about four inches, the preferred ratio between radius RF and radius RR thus being about 1.5. These dimensions establish an overall configuration which operates appropriately in airstream 102.

At least four first pressure sensing holes 150 are provided in the front wall 124 and the holes 150 preferably are arrayed in a symmetrical pattern on the front face 110. In the illustrated embodiment, sixteen holes 150 are arranged along concentric circles CFO and CFI, with eight holes 150 along outer circle CFO and eight holes 150 along inner circle CFI. Likewise, at least four second pressure sensing holes 160 are provided in the rear wall 134 and the holes 160 preferably are arrayed in a symmetrical pattern on the rear face 112. In probe 100, eight holes 160 are arranged along a single circle CRO coaxial with the central axis CX.

Probe 100 is constructed readily of a minimal number of component parts of relatively inexpensive materials. Thus, housing 120 is easily assembled from three parts, including a front shell-like member 170 (see FIGS. 4 and 5), a rear shell-like member 172, and a central disk-and-cylinder-like member 174, all readily formed of a synthetic polymeric material, as by vacuum forming. The three members 170, 172 and 174 are assembled, as by adhering the members together at 176, to establish housing 120. An external band 178 (see FIG. 4) is secured in place over the central member 174 and carries eyelets 180 for attachment of the suspension cables 104 and 106, as shown in FIGS. 4 and 5, but omitted from FIGS. 6 and 7 for clarity.

Figure 8:
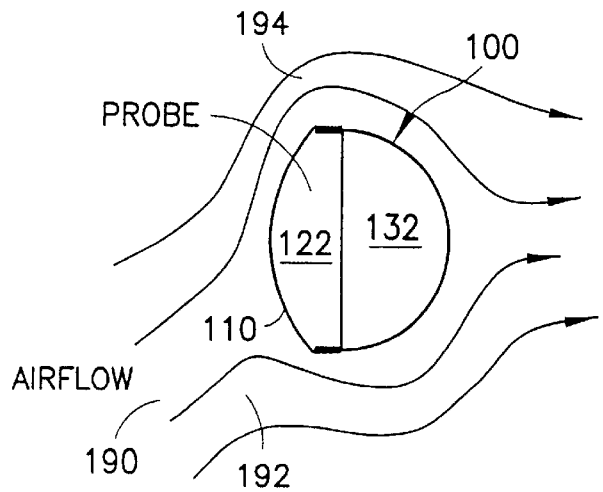
FIG. 8 is a diagrammatic view showing airflow impacting the probe at an angle.

Turning now to FIG. 8, probe 100 is seen placed within a stream 190 of turbulent air, the direction of the stream 190 being shown at an angle to the front face 110 of the probe 100 to illustrate the turbulent nature of the airflow. In view of the relatively large size of the probe 100, the turbulent air is substantially disturbed as the airflow impacts upon the probe 100 and makes a substantial change in direction as the air flows around the probe 100, as illustrated by the substantial changes in direction at 192 and at 194. The substantial change in direction of the airflow assures that a measurable pressure difference will be induced between the pressure in the high pressure chamber 122 and the pressure in the low pressure chamber 132, despite the presence of turbulence in the stream 190.

Figure 9:
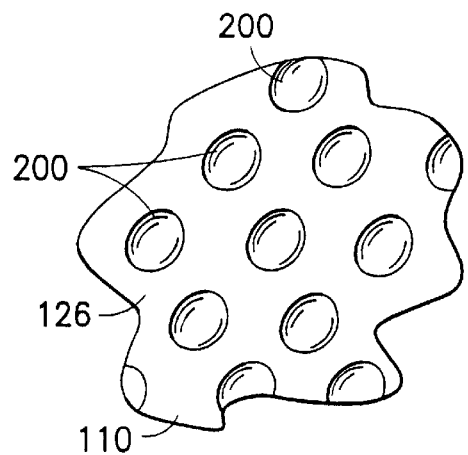
FIG. 9 is an enlarged fragmentary view of a portion of 9 of FIG. 4.

Additionally, the large size of the probe 100 assures that eddies impacting upon the large impact area provided by front face 110 of the probe 100 are considerably smaller than the area of the front face 110, with the result that eddies are forced to change in both shape and direction of movement. In this manner, the impact direction of the eddies is more predictable and impact angles are less severe, rendering measurements more accurate. The spherical contour of the convex configuration of front face 110 provides a curved configuration both horizontally and vertically so that measurements are maintained accurate regardless of whether turbulence strikes the probe 100 with a horizontal or with a vertical spin. As shown in FIG. 9, as well as in FIG. 4, the front surface 126 of front face 110 preferably is provided with a multiplicity of depressions located throughout the surface 126 of the front face 110, some of which depressions are illustrated in the form of dimples 200, in order to induce drag as air flows around the probe 100 and along the surface 126 of front face 110. The induced drag increases the pressure along the front face 110 and tends to distribute the pressure more evenly throughout the area of front face 110, thereby increasing the sensitivity of probe 100 for more accurate measurements.

Figure 10:
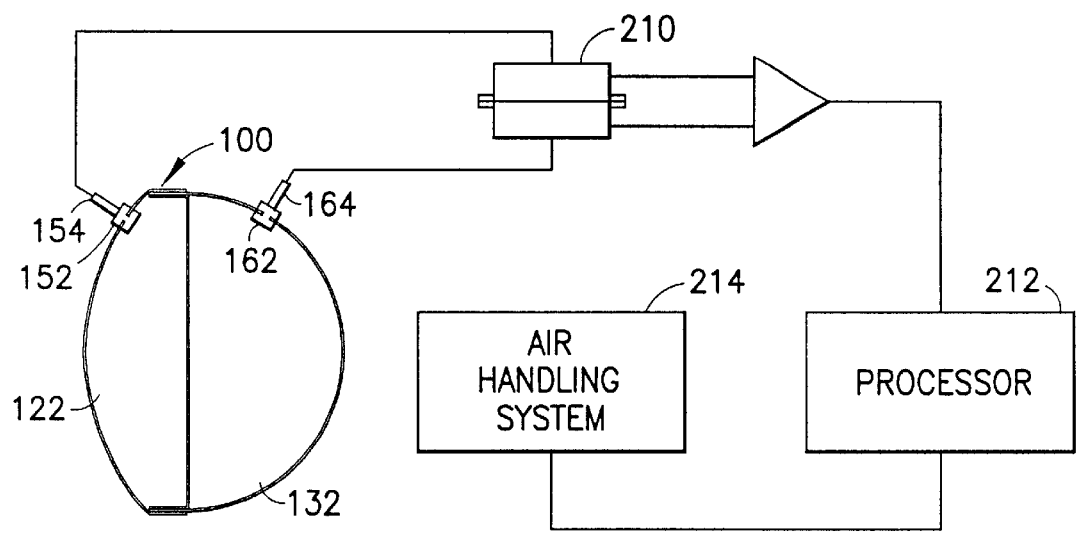
FIG. 10 is a schematic diagram illustrating a control system utilizing the probe and the method of the present invention.

Turning now to FIG. 10, information pertaining to the pressure in the high pressure chamber 122 of probe 100 is transmitted through high pressure pick-up port 152 and first fitting 154 to a differential pressure transducer 210, while information pertaining to the pressure in the low pressure chamber 132 is transmitted through low pressure pick-up port 162 and second fitting 164 to the differential pressure transducer 210. A signal generated by the differential, pressure transducer 210 then is transmitted to a processor 212 which provides control signals for controlling air handling system 214.

It will be seen that the present invention attains the several objects and advantages summarized above, namely: Provides a probe and a method for monitoring intake air volume in an air handling system, the probe having a construction enabling effective operation when installed where the intake air is traveling in a turbulent stream; enables accurate measurement of airflow volume over a very wide range of airflow volume, and does so in the presence of turbulence in the airflow; allows accurate monitoring of airflow volume at relatively low air velocities; accommodates extremes in air temperature and humidity for accomplishing accurate airflow volume measurements at a wide variety of installation sites, as well as wide variations in conditions encountered at a single site; resists degradation of performance in the presence of dirt and debris for long-term operation with little or no periodic maintenance; is less sensitive to noise, enabling accurate measurements under a variety of wind conditions encountered at an intake to an air handling system; exhibits a very wide range of operation, enabling greater versatility in applying the probe and the method to various locations and configurations at installations encountered in the field; provides a probe of relatively simple and inexpensive construction, capable of installation with ease at conventional sites for exemplary performance of the method over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A probe for use in monitoring intake air volume in an air handling system, wherein intake air travels in a turbulent stream flowing in a direction downstream from an upstream air intake, the probe comprising:

a high pressure chamber having a front wall including an external front face for facing upstream in the turbulent stream, transverse to the direction of flow of the turbulent stream, the front face having transverse dimensions establishing an impact area on the front face for disturbing the turbulent stream so substantially as to effect a substantial change in direction of the turbulent stream;

first pressure sensing holes in the front wall for establishing a first pressure in the high pressure chamber when the probe is placed in the turbulent stream;

a low pressure chamber having a rear wall including an external rear face for facing downstream in the turbulent stream, transverse to the direction of flow of the turbulent stream, when the front face faces upstream;

second pressure sensing holes in the rear wall for establishing a second pressure in the low pressure chamber when the probe is placed in the turbulent stream;

a seal between the high pressure chamber and the low pressure chamber for enabling establishment of a higher first pressure in the high pressure chamber as compared to a lower second pressure in the low pressure chamber;

a high pressure output for transmitting information pertaining to the first pressure in the high pressure chamber; and a low pressure output for transmitting information pertaining to the second pressure in the low pressure chamber;

whereby a difference between the first pressure and the second pressure provides information pertaining to intake air volume.

2. The invention of claim 1 wherein the front face includes a front convex curved configuration.

3. The invention of claim 2 wherein the front convex curved configuration follows a spherical contour.

4. The invention of claim 3 wherein:

the probe has a generally circular transverse peripheral profile;

the front face has a front transverse diameter extending to the peripheral profile; and the rear face has a rear transverse diameter extending to the peripheral profile.

5. The invention of claim 2 wherein the rear face includes a rear convex curved configuration.

6. The invention of claim 5 wherein:

the front convex curved configuration follows a front spherical contour configuration having a first radius;

the rear convex curved configuration follows a rear spherical contour configuration having a second radius; and the first radius is greater than the second radius.

7. The invention of claim 6 wherein the first radius is about 1.5 times the second radius.

8. The invention of claim 6 wherein:

the probe has a generally circular transverse peripheral profile;

the front face has a front transverse diameter extending to the peripheral profile;

the rear face has a rear transverse diameter extending to the peripheral profile; and the probe includes a generally cylindrical segment at the peripheral profile, the segment extending generally longitudinally between the front face and the rear face.

9. The invention of claim 8 wherein the generally cylindrical segment has a diameter of about eight inches.

10. The invention of claim 1 including at least four first pressure sensing holes, the four first pressure sensing holes being arrayed in a symmetrical pattern along the front face.

11. The invention of claim 10 including at least four second pressure sensing holes, the four second pressure sensing holes being arrayed in a symmetrical pattern along the rear face.

12. The invention of claim 1 wherein the first pressure sensing holes are arrayed symmetrically along concentric circles on the front face.

13. The invention of claims 12 wherein the second pressure sensing holes are arrayed symmetrically along a circle on the rear face.

14. The invention of claim 1 including a plurality of depressions located along the area of the front face for causing drag in the turbulent stream impacting upon the area of the front face.

15. The invention of claim 1 wherein the turbulent stream includes eddies of given dimensions, and the impact area on the front face includes dimensions substantially greater than the given dimensions of the eddies.

16. A method for use in monitoring intake air volume in an air handling system, wherein intake air travels in a turbulent stream flowing in a direction downstream from an upstream air intake, the method comprising the steps of:

placing a probe in the turbulent stream, the probe having a high pressure chamber with a front wall including an external front face for facing upstream in the turbulent stream, transverse to the direction of flow of the turbulent stream, and providing the front face with transverse dimensions establishing an impact area on the front face;

disturbing the turbulent stream so substantially as to effect a substantial change in direction of the turbulent stream by placement of the front face in the turbulent stream so that the stream impacts upon the impact area of the front face;

establishing a first pressure in the high pressure chamber indicative of a pressure at the front face when the probe is placed in the turbulent stream;

the probe including a low pressure chamber having a rear wall with an external rear face for facing downstream in the turbulent stream, transverse to the direction of flow of the turbulent stream, when the front face faces upstream;

establishing a second pressure in the low pressure chamber indicative of a pressure at the rear face when the probe is placed in the turbulent stream;

establishing a higher first pressure in the high pressure chamber as compared to a lower second pressure in the low pressure chamber;

transmitting information pertaining to the first pressure in the high pressure chamber;

transmitting information pertaining to the second pressure in the low pressure chamber; and utilizing a difference between the first pressure and the second pressure to provide information pertaining to intake air volume.

17. The invention of claim 16 including the step of causing drag in the turbulent stream impacting upon the area of the front face.

18. The invention of claim 16 wherein the turbulent stream includes eddies of given dimensions, and the step of placing the probe in the turbulent stream includes providing the impact area on the front face of the probe with dimensions substantially greater than the given dimensions of the eddies.

\* \* \* \* \*